United States Patent
Hu et al.

(10) Patent No.: US 10,297,004 B2
(45) Date of Patent: May 21, 2019

(54) MULTIPLE FRAME BUFFERS FOR WINDOWLESS EMBEDDED ENVIRONMENT

(71) Applicant: American Megatrends, Inc., Norcross, GA (US)

(72) Inventors: Tommy Hu, Taipei (TW); Derek Huang, Taoyuan (TW); Balasubramanian Chandrasekaran, Chennai (IN); Yugender P. Subramanian, Redmond, WA (US); David Yoon, Atlanta, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 141 days.

(21) Appl. No.: 15/604,825

(22) Filed: May 25, 2017

(65) Prior Publication Data

US 2018/0342042 A1    Nov. 29, 2018

(51) Int. Cl.
  *G06T 1/60*     (2006.01)
  *G06F 9/445*    (2018.01)
  *G06F 8/38*     (2018.01)
  *G06F 9/4401*   (2018.01)

(52) U.S. Cl.
  CPC ............... *G06T 1/60* (2013.01); *G06F 8/38* (2013.01); *G06F 9/4401* (2013.01); *G06F 9/445* (2013.01)

(58) Field of Classification Search
  CPC .......... G06T 1/60; G06F 9/4406; G06F 9/445
  See application file for complete search history.

(56) References Cited

U.S. PATENT DOCUMENTS

| | | | | |
|---|---|---|---|---|
| 5,797,003 A * | 8/1998 | Voce | ................... | G06F 9/44578 713/2 |
| 8,560,822 B1 * | 10/2013 | Chan | ........................ | G06F 8/65 713/1 |
| 2011/0167364 A1 * | 7/2011 | Pentikainen | ............ | G06F 9/451 715/764 |
| 2012/0062573 A1 * | 3/2012 | Kashimoto | ............... | G06T 1/60 345/501 |

* cited by examiner

*Primary Examiner* — William A Beutel
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor allocates a plurality of frame buffers. The service processor also writes image data of a predetermined image to a first frame buffer of the plurality of frame buffers. The service processor further loads a first application. The service processor displays the predetermined image in accordance with the image data stored in the first frame buffer while the first application is being loaded. The service processor then writes image data of the first application to a second frame buffer of the plurality of frame buffers.

8 Claims, 5 Drawing Sheets

MULTIPLE FRAME BUFFERS FOR WINDOWLESS EMBEDDED ENVIRONMENT

BACKGROUND

Field

The present disclosure relates generally to computer systems, and more particularly, to a service processor that utilizes multiple frame buffers for displaying user interfaces (UIs) of multiple applications in a windowless embedded environment.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device and also a service processor.

On an embedded device, when a single frame buffer is used, during switching between different UI applications, there will be some downtime where the screen is blank or receives no signals from the device. Therefore, there is a need for a mechanism that can reduce the downtime.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor allocates a plurality of frame buffers. The service processor also writes image data of a predetermined image to a first frame buffer of the plurality of frame buffers. The service processor further loads a first application. The service processor displays the predetermined image in accordance with the image data stored in the first frame buffer while the first application is being loaded. The service processor then writes image data of the first application to a second frame buffer of the plurality of frame buffers.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
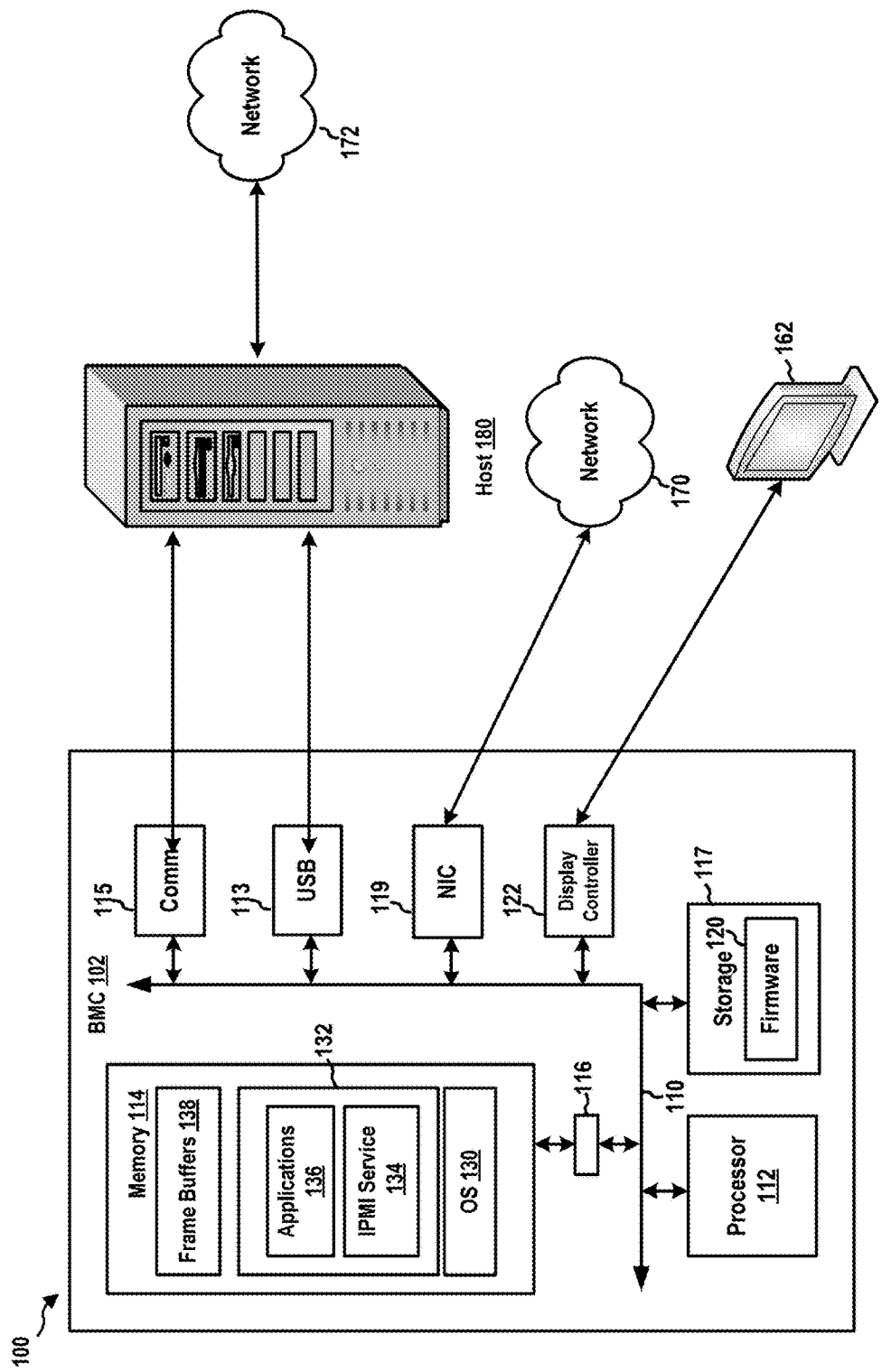
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating a computer system. In this example, the computer system includes, among other devices, a service processor 102 and a host computer 180. The service processor 102 has a processing unit 112, a memory 114, a memory driver 116, a display controller 122, a storage 117, a network interface card 119, a USB interface 113, and communication interfaces 115. The communication interfaces 115 may include a keyboard controller style (KCS), a server management interface chip (SMIC), a block transfer (BT) interface, a system management bus system interface (SSIF), and/or other suitable communication interface(s). Further, the service processor 102 may support IPMI and may provide an IPMI interface between the service processor 102 and the host computer 180. The IPMI interface may be implemented over one or more of the USB interface 113, the network interface card 119, and the communication interfaces 115. In certain configurations, one or more of the above components may be implemented as a system-on-a-chip (SoC). For examples, the processing unit 112, the memory 114, the memory driver 116, the display controller 122, the storage 117, the network interface card 119, the USB interface 113, and/or the communication interfaces 115 may be on the same chip. In addition, the memory 114, the processing unit 112, the memory driver 116, the display controller 122, the storage 117, the communication interfaces 115, and/or the network interface card 119 may be in communication with each other through a communication channel 110 such as a bus architecture.

The service processor 102 may store BMC firmware 120 in the storage 117. When the processing unit 112 executes the BMC firmware 120, the processing unit 112 loads code and data of the BMC firmware 120 into the memory 114. In particular, the BMC firmware 120 can provide in the memory 114 an operating system (OS) 130, an IPMI service 134, and one or more applications 136. The IPMI service 134 and the applications 136 may be implemented as a service stack 132. As such, the BMC firmware 120 provides an embedded system to the service processor 102. Further, as described infra, the BMC firmware 120 may allocate one or more areas of the memory 114 to function as one or more frame buffers 138. The display controller 122 can read image data from one of the frame buffers 138 and accordingly generate display signals for displaying images represented by those image data at a display 162.

The service processor 102 may be in communication with the host computer 180 through the USB interface 113, the network interface card 119, the communication interfaces 115, and/or the IPMI interface. The service stack 132 of the service processor 102 manages the host computer 180 and is responsible for managing and monitoring the server vitals such as temperature and voltage levels. The service stack 132 can also facilitate administrators to remotely access and manage the host computer 180. In particular, the service processor 102 may manage the host computer 180 in accordance with IPMI. The IPMI service 134 may receive and send IPMI messages to the host computer 180 through the IPMI interface. Further, the host computer 180 may be connected to a data network 172. In one example, the host computer 180 may be a computer system in a data center. Through the data network 172, the host computer 180 may exchange data with other computer systems in the data center or exchange data with machines on the Internet.

Further, the service processor 102 may be in communication with a communication network 170 (e.g., a local area network (LAN)). In this example, the service processor 102 may be in communication with the communication network 170 through the network interface card 119. Further, the communication network 170 may be isolated from the data network 172 and out-of-band to the data network 172. In certain configurations, the communication network 170 may not be connected to the Internet.

Figure 2:
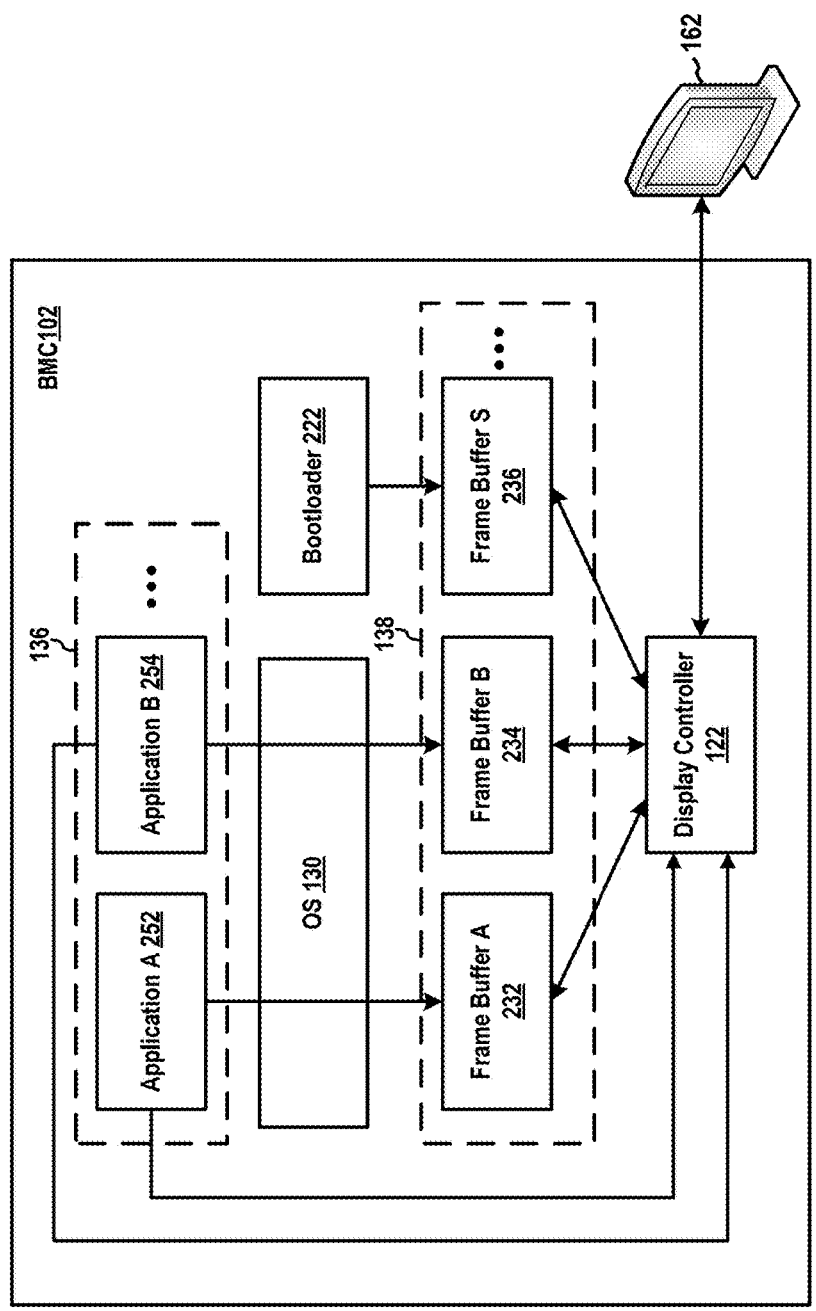
FIG. 2 is a diagram illustrating certain components of a BMC.

FIG. 2 is another diagram 200 illustrating certain components of the service processor 102. As described supra, when the service processor 102 is powered on or reset, the service processor 102 loads the BMC firmware 120. In particular, the BMC firmware 120 may include a bootloader 222. The processing unit 112 initially loads the bootloader 222 into the memory 114 and executes the bootloader 222. The bootloader 222 may allocate an area of the memory 114 for use as frame buffers 138. In this example, the frame buffers 138 include a frame buffer A 232, a frame buffer B 234, and a frame buffer S 236. Of course, the bootloader 222 can allocate additional frame buffers when needed as described infra. Further, the bootloader 222 may writes image data of a predetermined image into the frame buffer S 236. For example, the predetermined image may be a splash screen indicating that the system is being loaded. The image data in the frame buffer S 236 (or in the frame buffer A 232 and the frame buffer B 234 as described infra) specify the pixel value of each pixel of an image to be displayed on the display 162. The bootloader 222 may also instruct the display controller 122 to read data from the frame buffer S 236 and, accordingly, to generate display signals that drives the display 162 to display the predetermined image.

The bootloader 222 proceeds with loading the OS 130 into the memory 114. While the OS 130 is being loaded, the display 162 displays the predetermined image as stored in the frame buffer S 236. For example, the predetermined image may show the texts of "OS LOADING."

In certain configurations, the OS 130 may be a windowless system in an embedded environment. That is, the OS 130 does not employ different windows (frames) to display images of different applications. As such, the OS 130 does not allow two applications to write to the same frame buffer at the same time. Rather, a single application occupies the entire frame buffer at a time. In other words, a particular frame buffer only contains image data from a single application at any given time point and does not contain image data from more than one application at a time.

When the OS 130 is loaded completely, the OS 130 may launch an application A 252 from the applications 136 based on configurations or user inputs. The application A 252, after starting launching, may select to write image data (e.g., via the OS 130) to the frame buffer A 232. While the application A 252 is being launched, the display controller 122 continues displaying the predetermined image of the frame buffer S 236.

Subsequently, the application A 252 may determine that sufficient image data have been written into the frame buffer A 232. For example, the application A 252 may have launched to a point that a complete user interface has been written into the frame buffer A 232. Accordingly, the application A 252 instructs the display controller 122 to stop reading data from the current frame buffer (e.g., the frame buffer S 236) and to start reading data from the frame buffer A 232. As such, the display controller 122 starts generating display signals that drives the display 162 to display images (e.g., a user interface) provided by the application A 252. In certain configurations, the image data of the frame buffer S 236 are maintained in the frame buffer S 236.

Further, the OS 130 may launch the application B 254 based on configurations or user inputs. The application B 254, after starting launching, may select to write image data to the frame buffer B 234. While the application B 254 is being launched, the display controller 122 continues displaying the images of the frame buffer A 232 provided by the application A 252.

Subsequently, the application B 254 may determine that sufficient image data have been written into the frame buffer B 234. For example, the application B 254 may have launched to a point that a complete user interface has been written into the frame buffer B 234. Accordingly, the application B 254 instructs the display controller 122 to stop reading data from the current frame buffer (e.g., the frame buffer A 232) and to start reading data from the frame buffer B 234. As such, the display controller 122 starts generating display signals that drives the display 162 to display images (e.g., a user interface) provided by the application B 254. As such, a user may start using (e.g., interacting with) the application B 254 when the display 162 shows the user interface of the application B 254. On the other hand, the user interface of the application A 252 is not displayed on the display 162 anymore. In certain configurations, the OS 130 may decide to terminate the application A 252. In certain configurations, the OS 130 may continue running the application A 252 in the background, and the application A 252 may continue writing image data to the frame buffer A 232.

In certain configurations, the bootloader 222 may allocate another frame buffer C. The bootloader 222 or the OS 130 may write image data representing a second predetermined image. For example, the predetermined image may show the texts of "APPLICATION LAUNCHING." In such configurations, in the example described supra, when the application B 254 starts launching, the application B 254 may instruct the display controller 122 stop reading data from the current frame buffer (e.g., the frame buffer A 232) and to start reading data from the frame buffer C. While the application A 252 is being launched, the display controller 122 displays the second predetermined image of the frame buffer C. As such, the display 162 does not display the user interface of the application A 252 when the application B 254 is launching. Accordingly, the OS 130 may decide to terminate the application A 252.

Subsequently, the application B 254 may determine that sufficient image data have been written into the frame buffer B 234. Accordingly, the application B 254 instructs the display controller 122 to stop reading data from the current frame buffer (e.g., the frame buffer C) and to start reading data from the frame buffer B 234. As such, the display controller 122 starts generating display signals that drives the display 162 to display images (e.g., a user interface) provided by the application B 254. A user may start using with the application B 254 when the display 162 shows the user interface of the application B 254.

Figure 3:
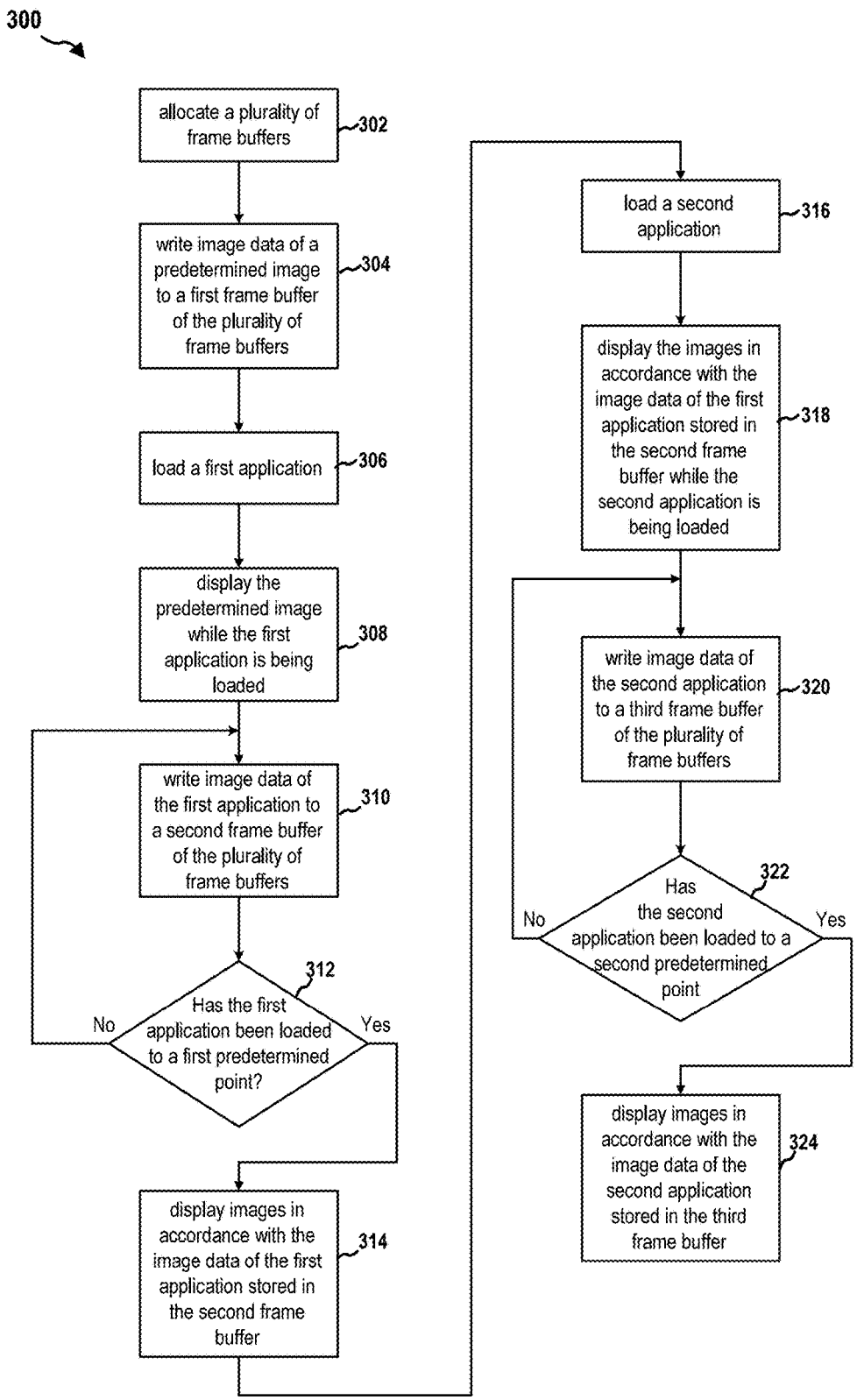
FIG. 3 is a flow chart of a method (process) for operating multiple frame buffers.

FIG. 3 is a flow chart 300 of a method (process) for operating multiple frame buffers. The method may be performed by a service processor (e.g., the service processor 102, the apparatus 102').

At operation 302, the service processor allocates a plurality of frame buffers. At operation 304, the service processor writes image data of a predetermined image to a first frame buffer of the plurality of frame buffers. At operation 306, the service processor loads a first application. At operation 308, the service processor displays the predetermined image in accordance with the image data stored in the first frame buffer while the first application is being loaded. At operation 310, the service processor writes image data of the first application to a second frame buffer of the plurality of frame buffers.

At operation 312, the service processor determines whether the first application has been loaded to a first predetermined point. If not, the service processor goes back to operation 310. If yes, at operation 314, the service processor displays images in accordance with the image data of the first application stored in the second frame buffer. In certain configurations, the service processor maintains the image data of the predetermined image in the first frame buffer.

At operation 316, the service processor loads a second application. At operation 318, the service processor displays the images in accordance with the image data of the first application stored in the second frame buffer while the second application is being loaded. At operation 320, the service processor writes image data of the second application to a third frame buffer of the plurality of frame buffers.

At operation 322, the service processor determines whether the second application has been loaded to a second predetermined point. If no, the service processor goes back to operation 320. If yes, at operation 324, the service processor displays images in accordance with the image data of the second application stored in the third frame buffer.

In certain configurations, the service processor continues running the first application in background. Further, the service processor continues write the image data of the first application to the second frame buffer while the images in accordance with the image data of the second application stored in the third frame buffer are being displayed.

In certain configurations, in response to the determination that the second application has been loaded to the second predetermined point, the service processor terminates the first application.

In certain configurations, after the service processor starts loading the second application, the service processor displays a second predetermined image in accordance with the image data stored in a fourth frame buffer while the second application is being loaded. The service processor may also terminate the first application.

Figure 4:
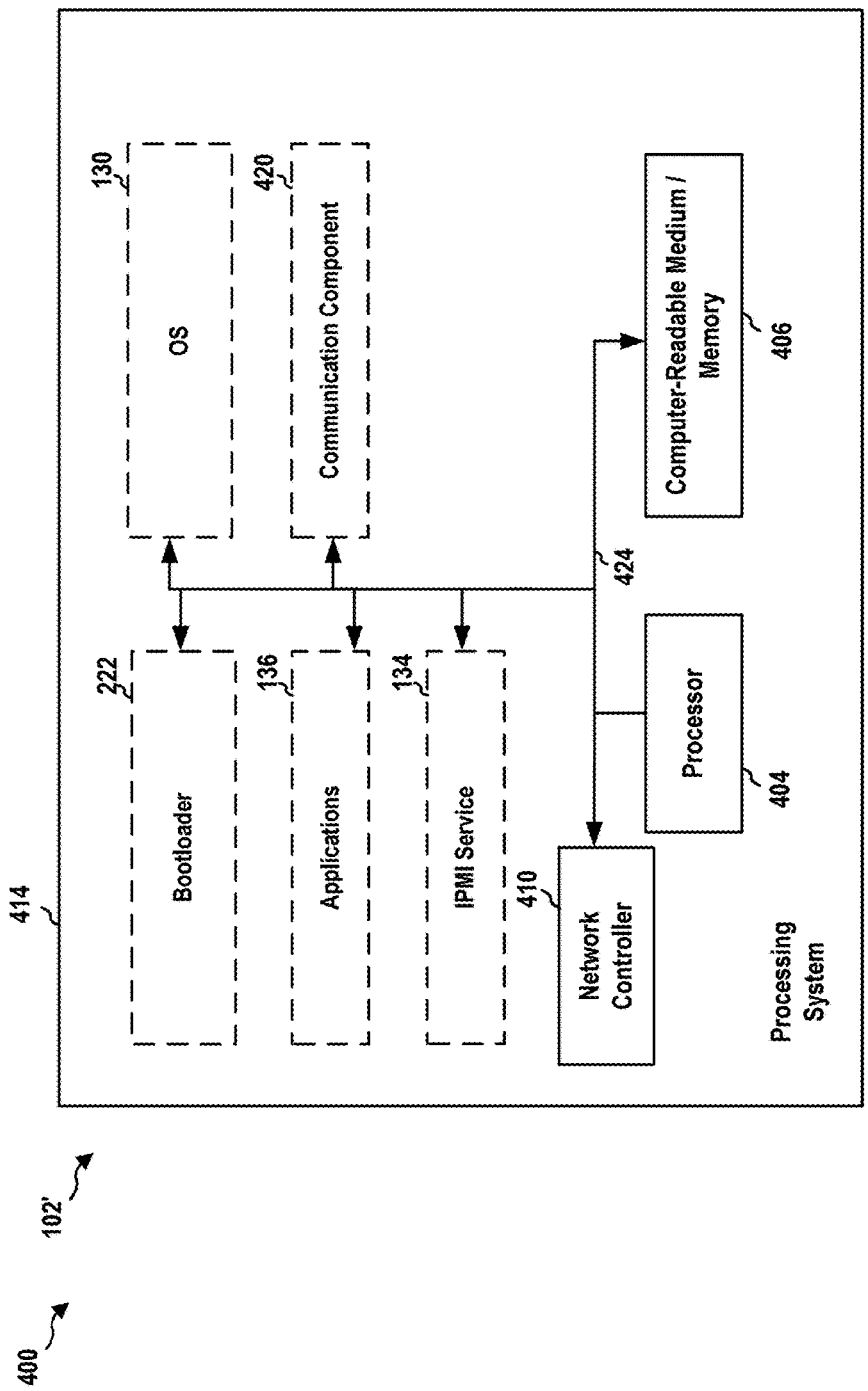
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the service processor 102. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the computer-readable medium/memory 406, a network controller 410, etc. The computer-readable medium/memory 406 may include the memory 114 and/or the storage 117. The bus 424 may also link various other circuits such as timing sources, peripherals, voltage regulators, and power management circuits, which are well known in the art, and therefore, will not be described any further.

The processing system 414 may be coupled to the network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the bootloader 222, the OS 130, the applications 136, and the IPMI service 134. The components may be software components running in the processor 404, resident/stored in the computer readable medium/memory 406, one or more hardware components coupled to the processor 404, or some combination thereof.

The apparatus 102' may be configured to include means for performing operations described supra referring to FIG. 3. The aforementioned means may be one or more of the aforementioned components of the apparatus 102 and/or the processing system 414 of the apparatus 102' configured to perform the functions recited by the aforementioned means.

Figure 5:
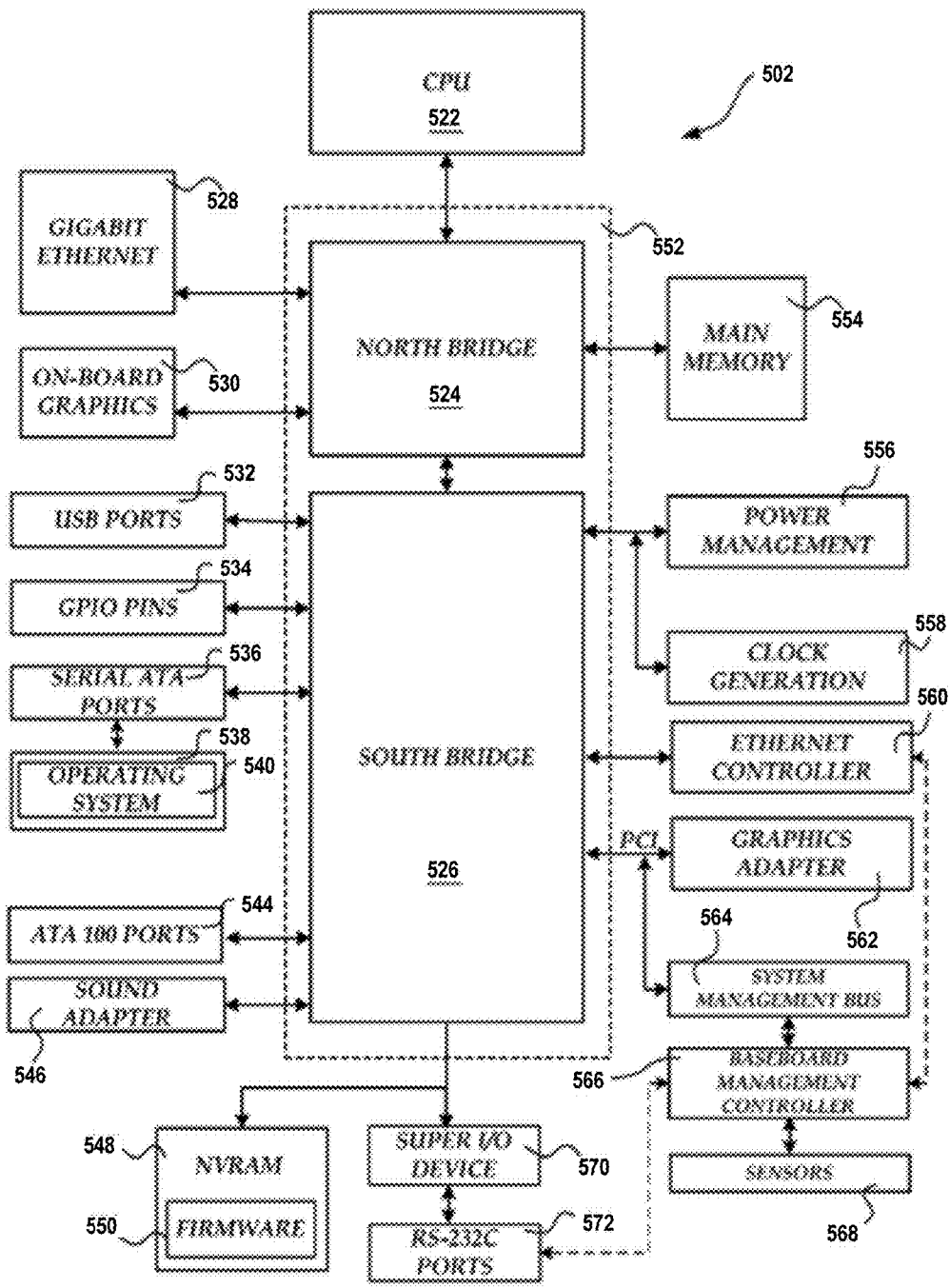
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the service processor 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
   allocating a plurality of frame buffers;
   writing image data of a predetermined image to a first frame buffer of the plurality of frame buffers;
   loading a first application;
   displaying the predetermined image in accordance with the image data stored in the first frame buffer while the first application is being loaded; and
   writing image data of the first application to a second frame buffer of the plurality of frame buffers;
   determining that the first application has been loaded to a first predetermined point;

displaying images in accordance with the image data of the first application stored in the second frame buffer;
maintaining the image data of the predetermined image in the first frame buffer;
loading a second application;
displaying the images in accordance with the image data of the first application stored in the second frame buffer while the second application is being loaded;
writing image data of the second application to a third frame buffer of the plurality of frame buffers;
determining that the second application has been loaded to a second predetermined point;
displaying images in accordance with the image data of the second application stored in the third frame buffer;
continuing running the first application in background; and
continuing writing the image data of the first application to the second frame buffer while the images in accordance with the image data of the second application stored in the third frame buffer are being displayed.

2. The method of claim 1, further comprising: terminating the first application.

3. The method of claim 1, further comprising:
loading a third application;
displaying a third predetermined image in accordance with the image data stored in a fourth frame buffer while the second application is being loaded; and
terminating the first application.

4. An apparatus, the apparatus being a service processor, comprising:
a memory; and
at least one processor coupled to the memory and configured to:
allocate a plurality of frame buffers;
write image data of a predetermined image to a first frame buffer of the plurality of frame buffers;
load a first application;
display the predetermined image in accordance with the image data stored in the first frame buffer while the first application is being loaded; and
write image data of the first application to a second frame buffer of the plurality of frame buffers;
determine that the first application has been loaded to a first predetermined point;
display images in accordance with the image data of the first application stored in the second frame buffer;
maintain the image data of the predetermined image in the first frame buffer;
load a second application;
display the images in accordance with the image data of the first application stored in the second frame buffer while the second application is being loaded;
write image data of the second application to a third frame buffer of the plurality of frame buffers;
determine that the second application has been loaded to a second predetermined point;
display images in accordance with the image data of the second application stored in the third frame buffer;
continue running the first application in background; and
continue writing the image data of the first application to the second frame buffer while the images in accordance with the image data of the second application stored in the third frame buffer are being displayed.

5. The apparatus of claim 4, wherein the at least one processor is further configured to terminate the first application.

6. The apparatus of claim 4, wherein the at least one processor is further configured to:
load a third application;
display a second predetermined image in accordance with the image data stored in a fourth frame buffer while the third application is being loaded; and
terminate the first application.

7. A non-transitory computer-readable medium storing computer executable code for operating a service processor, comprising code to:
allocate a plurality of frame buffers;
write image data of a predetermined image to a first frame buffer of the plurality of frame buffers;
load a first application;
display the predetermined image in accordance with the image data stored in the first frame buffer while the first application is being loaded;
write image data of the first application to a second frame buffer of the plurality of frame buffers;
determine that the first application has been loaded to a first predetermined point;
display images in accordance with the image data of the first application stored in the second frame buffer;
maintain the image data of the predetermined image in the first frame buffer;
load a second application;
display the images in accordance with the image data of the first application stored in the second frame buffer while the second application is being loaded;
write image data of the second application to a third frame buffer of the plurality of frame buffers;
determine that the second application has been loaded to a second predetermined point;
display images in accordance with the image data of the second application stored in the third frame buffer;
continue running the first application in background; and
continue writing the image data of the first application to the second frame buffer while the images in accordance with the image data of the second application stored in the third frame buffer are being displayed.

8. The non-transitory computer-readable medium of claim 7, wherein the code is further configured to terminate the first application.

* * * * *